United States Patent
Zhou et al.

(10) Patent No.: US 12,485,355 B2
(45) Date of Patent: Dec. 2, 2025

(54) METHOD, APPARATUS, ELECTRONIC DEVICE AND STORAGE MEDIUM FOR GAME DATA PROCESSING

(71) Applicant: BEIJING ZITIAO NETWORK TECHNOLOGY CO., LTD., Beijing (CN)

(72) Inventors: Xuancheng Zhou, Beijing (CN); Shangyong Dong, Beijing (CN); Yaotian Lin, Beijing (CN); Muyang Li, Beijing (CN); Bin Qiu, Beijing (CN); Xuliu Yan, Beijing (CN); Fang Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/522,401

(22) Filed: Nov. 29, 2023

(65) Prior Publication Data

US 2024/0091655 A1 Mar. 21, 2024

Related U.S. Application Data

(63) Continuation of application No. PCT/CN2023/081147, filed on Mar. 13, 2023.

(30) Foreign Application Priority Data

Mar. 18, 2022 (CN) .......................... 202210273174.X

(51) Int. Cl.
*A63F 13/86* (2014.01)
*A63F 13/69* (2014.01)
(Continued)

(52) U.S. Cl.
CPC .............. *A63F 13/86* (2014.09); *A63F 13/69* (2014.09); *A63F 13/795* (2014.09); *A63F 13/87* (2014.09); *H04L 51/10* (2013.01)

(58) Field of Classification Search
CPC .......... A63F 13/86; A63F 13/87; A63F 13/69; A63F 13/795; H04L 51/10
See application file for complete search history.

(56) References Cited

U.S. PATENT DOCUMENTS 10,140,392 B1 11/2018 Bowen
10,319,410 B1 * 6/2019 Townsend .............. G11B 27/30
(Continued)

FOREIGN PATENT DOCUMENTS

CN 105933211 A 9/2016
CN 108563521 A 9/2018
(Continued)

OTHER PUBLICATIONS

International Search Report (with English translation) and Written Opinion issued in PCT/CN2023/081147, dated May 24, 2023, 11 pages provided.

(Continued)

*Primary Examiner* — Carl V Larsen
(74) *Attorney, Agent, or Firm* — Astute IP Law Group

(57) ABSTRACT

This application provides a method, apparatus, electronic device, and storage medium for game data processing. The method includes: in response to a sharing instruction on a first page of a game application, obtaining data to be shared generated in the game application; jumping to a first target application and presenting a second page of the first target application, a preview of the data to be shared being displayed on the second page; adding a sticker to the data to be shared, the sticker being used to, after being triggered, perform a predetermined processing in a second target (Continued)

application on a terminal device that triggers the sticker; in response to an editing instruction performed on the sticker, editing the sticker; and publishing the data to be shared with the sticker in the first target application for sharing.

18 Claims, 6 Drawing Sheets

(51) Int. Cl.
*A63F 13/795* (2014.01)
*A63F 13/87* (2014.01)
*H04L 51/10* (2022.01)

(56) References Cited

U.S. PATENT DOCUMENTS

| | | | | |
|---|---|---|---|---|
| 11,100,182 | B1* | 8/2021 | Paul | G06Q 50/01 |
| 2008/0222527 | A1* | 9/2008 | Kang | G11B 27/105 |
| 2009/0208181 | A1* | 8/2009 | Cottrell | A63F 13/497 |
| | | | | 386/278 |
| 2014/0187315 | A1* | 7/2014 | Perry | A63F 13/88 |
| | | | | 463/29 |
| 2014/0259028 | A1* | 9/2014 | Atwood | G06F 9/543 |
| | | | | 719/313 |
| 2016/0021208 | A1* | 1/2016 | Freiman | H04L 67/306 |
| | | | | 709/203 |
| 2016/0182948 | A1* | 6/2016 | Shang | H04N 21/64322 |
| | | | | 725/41 |
| 2016/0334972 | A1* | 11/2016 | Cheng | G06T 11/60 |
| 2016/0335231 | A1* | 11/2016 | Hu | G06F 40/134 |
| 2017/0228600 | A1* | 8/2017 | Syed | G06V 20/62 |
| 2017/0282079 | A1* | 10/2017 | De La Cruz | A63F 13/5375 |
| 2018/0234371 | A1* | 8/2018 | Lande | H04L 51/18 |
| 2019/0158484 | A1* | 5/2019 | Grunewald | G06N 5/022 |
| 2021/0303112 | A1* | 9/2021 | Harrison | G06F 3/0488 |
| 2021/0336908 | A1* | 10/2021 | Taitz | H04L 51/52 |
| 2021/0375320 | A1* | 12/2021 | Wong | H04N 21/4223 |
| 2021/0387099 | A1* | 12/2021 | Desserrey | A63F 13/46 |
| 2022/0101415 | A1* | 3/2022 | Devoy, III | G06Q 30/0601 |
| 2022/0108727 | A1* | 4/2022 | van Welzen | G11B 27/036 |
| 2022/0113997 | A1* | 4/2022 | Liu | G06Q 30/0201 |
| 2022/0410004 | A1* | 12/2022 | van Welzen | A63F 13/49 |
| 2023/0333705 | A1* | 10/2023 | Khan | H04L 67/306 |

FOREIGN PATENT DOCUMENTS

| | | |
|---|---|---|
| CN | 108837510 A | 11/2018 |
| CN | 108965692 A | 12/2018 |
| CN | 109644294 A | 4/2019 |
| CN | 109992732 A | 7/2019 |
| CN | 110377200 A | 10/2019 |
| CN | 111494965 A | 8/2020 |
| CN | 111803953 A | 10/2020 |
| CN | 112138381 A | 12/2020 |
| CN | 112587916 A | 4/2021 |
| CN | 112843723 A | 5/2021 |
| CN | 112905082 A | 6/2021 |
| CN | 113384879 A | 9/2021 |
| CN | 113426140 A | 9/2021 |
| CN | 113556577 A | 10/2021 |
| CN | 113596598 A | 11/2021 |
| CN | 113617026 A | 11/2021 |
| CN | 113727024 A | 11/2021 |
| CN | 113852767 A | 12/2021 |
| CN | 114584599 A | 6/2022 |

OTHER PUBLICATIONS

Li Xueting, "Research and Application of Mobile Augmented Reality Interactive Learning System", Engineering Master's Thesis, Lanzhou Jiaotong University, Jan. 15, 2021, 57 pages, with English Abstract.
Notification to Grant Patent Right for Invention for Chinese Patent Application No. 202210273174.X, mailed on Apr. 17, 2023, 8 pages.
Zheng et al., "Learning Transportation Mode from Raw GPS Data for Geographic Applications on the Web", Microsoft Research Asia, ACM, Aug. 31, 2008, 10 pages.

* cited by examiner

METHOD, APPARATUS, ELECTRONIC DEVICE AND STORAGE MEDIUM FOR GAME DATA PROCESSING

This application is a continuation of International Patent Application No. PCT/CN2023/081147, filed on Mar. 13, 2023, which claims the benefit of CN Patent Application No. 202210273174.X filed on Mar. 18, 2022, both of which are incorporated herein by reference in their entireties.

FIELD

The present application relates to the field of computers, particularly to a method, apparatus, electronic device and storage medium for game data processing.

BACKGROUND

With the development of science and technology, electronic games have been integrated into mainstream culture and have become a very common way of leisure and entertainment. Game data sharing is a common operation for users during a process of playing electronic games. Specifically, users share relevant data generated in the game to other applications to achieve game data sharing and interact with users in other applications based on this.

However, in solutions of game data sharing within related technologies, the content of game data sharing is fixed and cannot be interacted with users, which results in the content of game data sharing, being single, poor interactivity, and unable to reflect personalized content for users.

SUMMARY

In view of this, a purpose of this application is to propose a method, apparatus, electronic device, and storage medium for game data processing.

Based on the above purpose, the present application provides a method of game data processing, comprising:
  in response to a sharing instruction on a first page of a game application, obtaining data to be shared generated in the game application;
  jumping to a first target application and presenting a second page of the first target application, a preview of the data to be shared being displayed on the second page;
  adding a sticker to the data to be shared, the sticker being used to, after being triggered, perform a predetermined processing in a second target application on a terminal device that triggers the sticker;
  in response to an editing instruction performed on the sticker, editing the sticker; and
  publishing the data to be shared with the sticker in the first target application for sharing.

In some implementations, adding a sticker to the data to be shared comprises: determining at least two different types of stickers, wherein different types of stickers are used to perform different predetermined processing; determining at least one target sticker based on an association relationship between a type of sticker and a page content of the first page; generating a sticker generation parameter based on the page content of the first page; and adding the target sticker to the data to be shared based on the sticker generation parameter.

In some implementations, adding a sticker to the data to be shared comprises: determining at least one interaction event associated with the game application in the first target application; determining at least one target sticker based on one or more of the at least one interactive event; generating a sticker generation parameter for the target sticker; and adding the target sticker to the data to be shared based on the sticker generation parameter.

In some implementations, based on the data to be shared, an interaction event associated with the data to be shared is determined in the at least one interaction event; and the at least one target sticker is determined based on the interaction event associated with the data to be shared.

In some implementations, preference data of a current user is obtained; based on the preference data, an interaction event associated with the preference data is determined among the at least one interaction event; and the at least one target sticker is determined based on the interaction event associated with the preference data.

In some implementations, the predetermined processing comprises one of: jumping to a third page in the second target application; sending a reminder message to a target user in the second target application; setting a reminder task to be triggered at a target date; generating counting data for a predetermined voting event and performing counting statistics; or jumping to a third target application on the terminal device that triggers the sticker.

In some implementations, the method further comprises generating the data to be shared by: in response to a predetermined in-game event occurring while the game application is running, generating at least one of a video clip and a picture corresponding to the in-game event; determining in-game relevant information of a user who completes the in-game event; and generating the data to be shared based on the at least one of the video clip and the picture of the in-game event, and based on the in-game relevant information.

In some implementations, generating at least one of a video clip and a picture corresponding to the in-game event comprises: determining a performance parameter of a current terminal device and a current network environment parameter; and in response to determining that at least one of the performance parameter and the network environment parameter fails to meet a corresponding standard value, only generating a picture corresponding to the in-game event.

In some implementations, generating the data to be shared based on the at least one of the video clip and the picture of the in-game event, and based on the in-game relevant information comprises: selecting a predetermined number of target video clips from a certain number of video clips of the in-game event; concatenating the predetermined number of the target video clips to obtain a video data set; and generating the data to be shared based on the video data set and the in-game relevant information.

In some implementations, selecting a predetermined number of target video clips from a certain number of video clips of the in-game event comprises: determining a priority of each in-game event; and selecting, based on the priority, the predetermined number of target video clips.

In some implementations, selecting, based on the priority, the predetermined number of target video clips comprises: in response to determining a predetermined highest priority among priorities of respective in-game events, selecting a video clip of the in-game event with the highest priority as the target video clip; and in response to determining no predetermined highest priority among the priorities of the respective in-game events, selecting the predetermined number of target video clips in order of the priorities from high to low.

In some implementations, generating the data to be shared based on the at least one of the video clip and the picture of the in-game event, and based on the in-game relevant information comprises: generating the data to be shared by a predetermined generation algorithm of game sharing data based on the at least one of the video clip and the picture of the in-game event, and based on the in-game relevant information.

Based on the same technical concept, the present application further provides an apparatus for game data processing, comprising:
- an obtaining module configured to, in response to a sharing instruction on a first page of a game application, obtain data to be shared generated in the game application;
- a jumping module configured to jump to a first target application and show a second page of the first target application, a preview of the data to be shared being displayed on the second page;
- an adding module configured to add a sticker to the data to be shared, the sticker being used to, after being triggered, perform a predetermined processing in a second target application on a terminal device that triggers the sticker;
- an editing module configured to, in response to an editing instruction performed on the sticker, edit the sticker; and
- a sharing module configured to publish the data to be shared with the sticker in the first target application for sharing.

Based on the same technical concept, the present application further provides an electronic device comprising a memory, a processor, and a computer program stored on the memory and executable on the processor. The processor, when executing the program, implements any of the methods described above.

Based on the same technical concept, the present application further provides a non-transitory computer readable storage medium storing computer instructions for causing a computer to perform any of the methods described above.

BRIEF DESCRIPTION OF THE DRAWINGS

In order to more clearly illustrate the technical solutions in the present application or related technologies, the accompanying drawings required for use in the description of embodiments or related technologies will be briefly introduced below. Apparently, the accompanying drawings described below are only embodiments of the present application. For those skilled in the art, without creative labor, other drawings can also be obtained based on these drawings.

DETAILED DESCRIPTION

Figure 1:
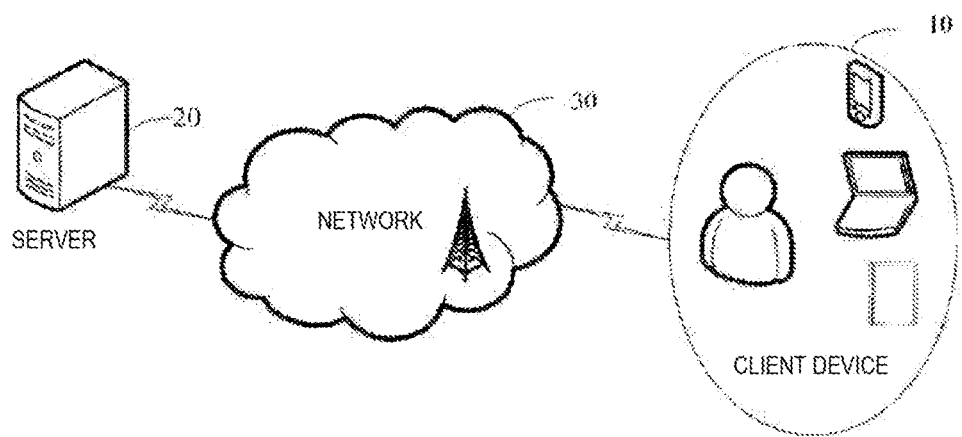
FIG. 1 is a schematic diagram of an application scenario of the embodiments of the present application.

To make the purpose, technical solutions and advantages of the present application more apparent, in conjunction of the following specific embodiments and with reference to the drawings, the present application is further described in detail.

The following will refer to several exemplary implementations to describe the principles and spirit of this application. It should be understood that these implementations are only provided to enable those skilled in the art to better understand and implement this application and are not intended to limit the scope of this application in any way. On the contrary, these implementations are provided to make this application more thorough and complete, and to fully convey the scope of this application to those skilled in the art.

According to the implementations of the present application, a method, apparatus, electronic device, and storage medium for game data processing are proposed.

Herein, it should be understood that any number of elements in the drawings is used as an example rather than a limitation, and any naming is only for distinction and does not have any limiting meaning.

Referring to several representative implementations of this application, the principles and spirit of this application are explained in detail.

In a sharing scenario of game data related to technology, the game data shared by users can often only be fixed content, with single content and lack of interaction and personalization. For example, in a Multiplayer Online Battle Arena (MOBA), under a sharing solution of game data related to technology, after obtaining a new hero character, the users can generate sharing data based on an event of the obtained new hero character and share it with other applications (such as social applications, short video applications, etc.). The sharing data generally only includes an introduction video or picture about the newly obtained hero character, accompanied by set text content (such as "I got a new hero!"). Apparently, for different users, the sharing data shared in other applications when obtaining the hero character is the same or basically the same. Whether for the sharing user or the shared users, the sharing data content is too single, and other users cannot interact based on the shared game data. The sharing user cannot make personalized expressions in the process of sharing game data.

In view of the above problems, the present application provides a solution of game data processing. On the basis of the data to be shared generated in the game application, stickers are further added to enrich the content of data to be shared by the stickers. The added stickers can also be edited by the users, and personalized content can be added to the data to be shared based on user editing. Through the solution of the present application, the content of game data sharing can be effectively enriched and personalized expression can be achieved. In addition, the added stickers can also perform a predetermined processing in the application on a triggering terminal device after being triggered, improving the interactivity of game data sharing.

Referring to FIG. 1, a schematic diagram of an application scenario of a method of game data processing of the embodiments of the present application. The application scenario includes a client device 10 and a server 20, wherein the client device 10 may be connected to the server 20 via a network 30 to implement data interaction.

Optionally, the client device 10 may be an electronic device with data transmission and multimedia input/output functions near a user side, such as a computer, a tablet, a smartphone, a car-mounted computer, a wearable device, etc. The electronic device may run various types of applications, including game applications. The application refers to an application program that completes one or more specific tasks, runs in a user mode, may interact with the user, and has a visual User Interface.

Alternatively, the server 20 may be an independent physical server, or a server cluster or distributed system composed of multiple physical servers and may also be cloud server providing basic cloud computing service such as cloud services, cloud databases, cloud computing, cloud functions, cloud storage, network services, cloud communications, middleware services, domain name services, security services, CDN, and big data and artificial intelligence platforms. The server 20 may provide data storage and data processing support for the operation of applications installed on the client device 10.

The user may generate game data to be shared using a game application on the client device 10 and publish the game data in a target application to achieve game data sharing. Other users may view the shared game data in the target application by using the client device 10.

The method of game data processing according to the exemplary embodiments of the present application will be described below in conjunction with the application scenario in FIG. 1. It should be noted that the above application scenario is only shown for the convenience of understanding the spirit and principles of the present application, and the embodiments of the present application are not limited in this regard. On the contrary, the embodiments of the present application may be applied to any applicable scenario.

First, the embodiments of the present application provide a method of game data processing. The method is applied to the client device.

Figure 2:
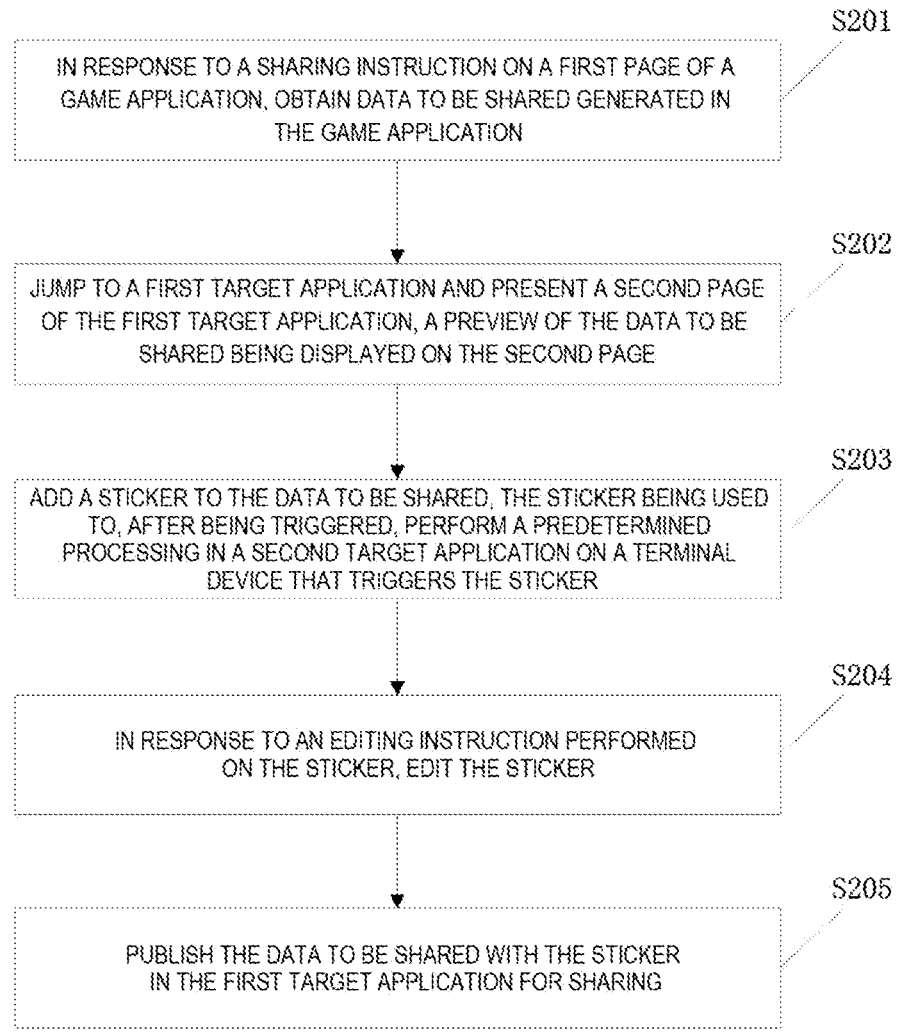
FIG. 2 is a schematic flowchart of a method of game data processing of the embodiments of the present application.

Referring to FIG. 2, the method of game data processing of the embodiment may include the following steps.

Step S201, in response to a sharing instruction on a first page of a game application, obtain data to be shared generated in the game application.

In this embodiment, the game application refers to an application that provides electronic game functions currently running on the client device. For example, common MOBA game applications, chess and card game applications, etc., Specific game types of game applications are not limited in the embodiments of this application.

In this embodiment, a first page refers to a page that provides game data sharing function in the game application. Taking the MOBA game application as an example, the first page may be a page for obtaining a new hero character, a page for obtaining a new hero character skin, and a page for ending a match. The user may input a sharing instruction on the first page to trigger the sharing of game data. Specifically, a button with a sharing function may be set in the first page, and the user may input the sharing instruction by triggering the button. In addition, the sharing instruction may also be implemented by the user inputting a predetermined operation in the first page, such as sliding in a predetermined direction, drawing a predetermined graphic, etc. It should be noted that the specific way of inputting the sharing instruction may be implemented by any feasible related technology and is not limited in the embodiments of this application.

In this embodiment, in response to the sharing instruction on the first page, the data to be shared generated in the game application is obtained. The data to be shared refers to game data that the user intends to share, and the content included in the data to be shared is associated with the first page. Taking the MOBA game application as an example, in response to a sharing instruction on a page for obtaining a new hero character, the generated data to be shared may be an introduction video, a picture, etc. of the hero character; in response to a sharing instruction on a page of ending a match, the generated data to be shared may be a video clip, a screenshot, a match result, game data of the match, etc. in the match. In addition, the data to be shared may further include relevant information of the user, such as a username, a nickname, an in-game level, etc. It is noted that, for the specific manner of obtaining data to be shared generated in the game application may be implemented by any feasible related technology and is not limited in the embodiments of the present application.

Step S202, jump to a first target application and presenting a second page of the first target application, a preview of the data to be shared being displayed on the second page.

In the embodiments of the present application, after obtaining the data to be shared generated in the game application, jump to another application installed on the client device. The application is an application to which the user intends to share game data, referred to as a first target application in this embodiment. For example, the first target application may be a short video application, a social application, other game applications, etc. The embodiments of the present application do not limit a type of a functional service provided by the first target application.

During specific implementation, an association relationship between the game application and the first target application may be predetermined through a Software Development Kit (SDK) with corresponding functions, and after responding to the sharing instruction obtaining the data to be shared in the game application, the operation of jumping to the first target application may be performed.

In this embodiment, after jumping to the first target application, it will enter a second page of the target application accordingly. The second page refers to a page pre-associated with the game application for sharing game data. Taking the first target application as a social application as an example, the second page may be a page for social circle, and the data to be shared will be used as content material for subsequent user updates. Taking the first target application as a social application as an example, the second page may be a social circle page, and data to be shared will be used as content material for subsequent user dynamics During specific implementation, a preview of the data to be shared will be displayed on the second page, and the user may intuitively see the data to be shared to be published on the second page through the preview.

Step S203, add a sticker to the data to be shared, the sticker being used to, after being triggered, perform a predetermined processing in a second target application on a terminal device that triggers the sticker.

In this embodiment, a sticker is added to the preview of the data to be shared displayed on the second page. The sticker is a texture object displayed on a page, and the relevant material may be called by a predetermined function to display a page object on the page. The displayed page object is the sticker.

During specific implementation, the sticker may include not only basic textures, but also a text content. The text content of the sticker, as well as other basic attributes of the sticker such as a shape, a size, a display position, etc., may be edited by the user to achieve the user's personalized expression.

In this embodiment, the sticker is further set as an interactive object. Specifically, after the sticker is triggered, a predetermined processing is performed in the second target application on the terminal device that triggers the sticker. The terminal device that triggers the sticker generally refers to a terminal device used by the shared user, and the shared user may view the game data for sharing published by the sharing user in the application corresponding to the first target application installed on the terminal device used by the shared user. In the embodiments of this application, for convenience of expression, the terminal device that triggers the sticker is referred to as a shared terminal device. For example, after the user who publishes the sharing publishes the data to be shared with a sticker through a short video application installed on the terminal device that performs the method of this embodiment, the shared users view the above data to be shared with the sticker through the short video application installed on the shared terminal device they are using.

In this embodiment, the second target application is an application installed on the shared terminal device. In some implementations, the second target application may be an application that provides the same functional service as the first target application. For example, both the first target application and the second target application are short video applications named A. In some other implementations, the second target application may also be an application that provides the same game functional service as the game application; both the second target application and the game application are game applications named B. In some other implementations, the second target application may also be different from the first target application and the game application and provide other functional services. For example, the first target application is a short video application named A, the game application is a game application named B, and the second target application is a social application named C.

As an optional implementation, the sticker added to the data to be shared is determined based on the page content of the first page. The page content refers to the content included and presented on the first page. Taking the MOB A game application as an example, for pages obtaining a new hero character, obtaining a new hero character skin, and ending a match, these pages have different page contents.

In specific implementation, corresponding to the page content of the first page, the sticker may be divided into different types, the different types of stickers are triggered after performing different predetermined processing.

As an option, the predetermined processing may comprise: jumping to a third page in the second target application. For example, a type of the sticker that performs the above predetermined processing may be referred to as a jumping type. Specifically, after the sticker with the jumping type is triggered, it will jump from the current second page in the second target application to the third page in the second target application. For example, if the current page of the shared terminal device is a short video browsing page of the short video application, after the sticker is triggered, it may jump from the short video publishing preparation page to a topic discussion page, a short video collection page, etc. in the short video application.

As an option, the predetermined processing may comprise: sending a reminder message to a target user in the second target application. Exemplarily, a type of the sticker that performs the predetermined processing may be referred to as a notification type. Specifically, after the sticker with the notification type is triggered, it will send the reminder message to the target user associated with the sticker in the second target application, i.e., achieving an effect of "@ target user". For example, if the sticker is associated with the target user in the second target application, the target user is a friend of the user who shares the game data. After the sticker is triggered, the reminder message will be sent to the target user to remind him to view the published game data.

As an optional option, the predetermined processing may comprise: setting a reminder task to be triggered at a target date. Exemplarily, a type of the sticker that performs the predetermined processing may be referred to as a reminder type. Specifically, after the sticker with the reminder type is triggered, the reminder task to be triggered at the target date will be created in the second target application. When the target date is reached, a reminder event will be triggered to remind the user of the shared terminal device. For example, the first target application is a short video application, through which the data to be shared with the sticker is shared. After the user of the shared terminal device triggers the sticker in the second target application, the reminder task to be triggered at the target date will be set in the second target application. The target date may be an activity in the first target application or game application, such as game events, version updates, etc. The second target application may be a short video application. When the reminder event is set in the short video application, the second target application may also be a system calendar application of the shared terminal device. The reminder task is set through the system calendar application.

Alternatively, the predetermined processing may generate counting data for a predetermined voting event and perform counting statistics. Exemplarily, a type of the sticker that performs the predetermined processing may be referred to as a voting type. Specifically, the sticker with the voting type includes several options for user selecting, and the user selects the options in the sticker by triggering the sticker. For example, the first target application is a short video application that shares a obtained new hero character in the game application. The corresponding sticker may include different options: "yes" or "no" whether to view relevant information of the hero character. The user of the shared terminal device may trigger the options on the sticker in the second target application to generate the counting data based on the user's selection, and statistics may be performed based on the counting data of different users. The statistical results may be presented to the user after the sticker is triggered.

Alternatively, the predetermined processing may comprise: pulling up a third target application on the terminal device that triggers the sticker. Exemplarily, a type of the sticker that performs the predetermined processing may be referred to as a pull-up type. Specifically, after the sticker with the pull-up type is triggered, the third target application will be pulled up on the shared terminal device. For example, the first target application is a short video application, and obtaining a new hero character in the game application is shared through the short video application. The second target application is a short video application on the shared terminal device. After the user triggers the sticker in the short video application, the third target application will be pulled up. The third target application may be a game application, so that the user of the shared terminal device can quickly enter the game application from which the shared game data comes through the sticker and realize linkage.

During specific implementation, based on the page content of the first page, adding the sticker to the data to be shared may specifically include the steps of: determining at least two different types of stickers; wherein different types of stickers are used to perform different predetermined processing; determining at least one target sticker based on an association relationship between a type of sticker and a page content of the first page; generating a sticker generation parameter based on the page content of the first page; adding the target sticker to the data to be shared based on the sticker generation parameter.

Specifically, based on a function and content characteristic of the first page expressed by the page content of the first page, as well as the functional characteristics of the stickers with the respective types, the association relationship between the type of sticker and the page content of the first page is predetermined. Through this association relationship, based on a current page content of the first page, an associated sticker, that is, the target sticker, is selected from all types of stickers.

As an example, taking the MOBA game application as an example, the association relationship may include the followings.

When the first page is the end of the game page, personal history record page, player achievement page, etc., video clips of the game are often formed in the above page as shared game data. Based on the above page content, stickers of the jump class may be associated, so that users of the shared terminal device may jump to topics such as discussion pages and video collection pages through the sticker of the jump class. Such settings may present more aggregated content to users to improve the interactivity of different applications.

When the first page is a match ending page, a personal history record page, a player achievement page, etc., video clips of game matches or personal in-game data will often be formed as shared game data on the above pages. Based on the content of the above pages, a sticker with the notification type may be associated, allowing the user to share his personal match video clips or in-game data and notify specific target user. This setting may meet the users' social needs and improve the interactivity.

When the first page is the game event page or activity page, specific dates of the game event or activity are often included on the above page. Based on the content of the above page, a sticker with the reminder type may be associated to remind the user in a timely manner when the game event or activity reaches the corresponding date. This setting may ensure the timeliness of in-application activity and improve the interactivity of different applications.

When the first page is about obtaining a new hero character, obtaining a new hero character skin, a game event page, and an activity page, a content related to the hero character, the skin, and the activity will often be formed as the shared game data. Based on the content of the above pages, a sticker with the voting type may be associated, making full use of the shared game data content to obtain the counting data quickly and intuitively for statistics. While meeting the user's sharing needs, it can also improve the efficiency of obtaining related data.

In addition, for the first page of any page content included in the game application, it may also be associated with a sticker with the pull-up type, so that the user of the shared terminal device can quickly enter the corresponding game application through the sticker of the pull-up type, improving the interactivity of different applications.

During specific implementation, when adding the sticker to the data to be shared, a sticker generation parameter is generated based on the page content of the first page. The sticker generation parameter comes from or is associated with a current actual page content of the first page. Based on the sticker generation parameter, the specific content of the sticker finally added to the data to be shared may correspond to the page content of the first page. For example, taking the page content of the foregoing first page, the type of sticker, and the MOBA game application as examples, for the sticker with the jumping type generated based on the match ending page, the sticker generation parameter may be a specific hero character included in the match ending page, and a page address of a topic discussion page of the hero character determined based on the specific hero character. For a sticker with the notification type generated based on the match ending page, the sticker generation parameter may be a participating user or a friend of the participating user of a game match corresponding to the match ending page. For a sticker with the reminder type generated based on an activity page, the sticker generation parameter may be a specific date of the activity presented in the activity page. For a sticker with the voting type generated based on a page of obtaining a new hero character, the sticker generation parameter may be an option in a relevant statistical task of the newly obtained hero character.

The sticker generation parameter of each of the above-described specific forms and contents may be generated based on the page content of the first page, by any feasible related techniques, such as page data crawling, image recognition, data association, etc., which are not limited in the embodiments of the present application.

As another optional implementation, the sticker added to the data to be shared is determined based on an interaction event associated with the game application within the first target application. Herein, the sticker may be divided into different types, including the above jumping type, notification type, reminder type, voting type, pull-up type, etc.

During specific implementation, based on the interaction event associated with the game application within the first target application, adding the sticker to the data to be shared may specifically include the following steps: determining at least one interaction event associated with the game application in the first target application; determining at least one target sticker based on one or more of the at least one interactive event; generating a sticker generation parameter for the target sticker; and adding the target sticker to the data to be shared based on the sticker generation parameter.

Herein, the interaction event refers to an event in the first target application related to a theme, a game content, and time-sensitive content of the game application. For example, news of the game, LIVE of the game, etc. In the embodiments of the present application, the interaction event occurs or is implemented in the first target application, and the interaction event is associated with the game application that generates the data to be shared. Taking the first target application as a short video application as an example, if a business content provided by the game application is specifically Game A, the interaction event may be a LIVE event of Game A in the first target application, a version update notice of Game A, and a new game content introduction of Game A, etc.

As an optional implementation, determining at least one target sticker based on one or more interaction events may specifically include: determining, based on the data to be shared, an interaction event associated with the data to be shared in the at least one interaction event; and determining the at least one target sticker based on the interaction event associated with the data to be shared. That is, for the case that there are a plurality of interaction events, the interaction event associated with the data to be shared may be further determined based on the data to be shared. For example, the data to be shared is a match video of a PVP match in the MOBA game application. The first target application is a short video application, where the plurality of interaction events are game LIVEs of the game. Then, based on the data to be shared, the game LIVE that includes or will have the PVP match content may be selected from a plurality of game LIVEs as an interaction event associated with the data to be shared.

As another optional implementation, determining at least one target sticker based on one or more interaction events may specifically include: obtaining preference data of a current user; determining, based on the preference data, an interaction event associated with the preference data among the at least one interaction event; and determining the at least one target sticker based on the interaction event associated with the preference data. That is, for the case that there are a plurality of interaction events, the interaction event associated with the preference data may be further determined based on the preference data. Herein, the current user refers to a user who performs data sharing operations, such as the current logged-in user of the first target application and game application. The preference data refers to data used to express the user's usage habits, such as which games he prefers to play, which videos he watches, etc. It should be noted that the preference data may be obtained based on any relevant technology, and the data based on is actively disclosed by the user or authorized by the user. For example, the current user's preference data indicates that the user prefers to watch a match content of the PVP game. The first target application is a short video application, wherein the plurality of interaction events are game LIVEs of the game; based on the above preference data, a game LIVE that includes or will have the PVP match content may be selected from the plurality of game LIVEs as an interaction event associated with the data to be shared.

During specific implementation, based on the determined interaction event, the associated sticker, that is, the target sticker, may be selected from all types of stickers. As an example, taking the MOBA game application as an example, determining the target sticker based on the interaction event may include the following.

When the interaction event is a LIVE event, common ones include a game event LIVE, a game activity LIVE, a host play LIVE, etc. Correspondingly, a sticker with the reminder type may be associated to remind the user in a timely manner when the game event or activity reaches the corresponding date. This setting may ensure the timeliness of in-application activity and improve the interactivity of different applications.

When the interaction event is a new launch event for the game content, common ones include a new hero release news and a new skin introduction video, etc. Correspondingly, stickers with the voting and jumping type may be associated. stickers with the voting type may make full use of the shared game data content to obtain relevant counting data quickly and intuitively for statistics. Stickers with the jumping type may easily and quickly jump to a discussion page and a video collection page related to the new launch content, presenting more aggregated content to the user to improve the interactivity of different applications.

In addition, for any interaction event within the first target application, stickers with the pull-up and notification types may also be associated. By stickers with the pull-up type, the user of the shared terminal device may quickly enter the corresponding game application through the stickers with the pull-up type, improving the interactivity of different applications. Through the stickers with the notification type, the user may notify specific target user of interaction events to meet social needs and improve the interactivity.

During specific implementation, when adding the sticker to the data to be shared, the sticker generation parameter is generated based on the interaction event, and the sticker generation parameter comes from or is associated with the interaction event. The sticker generation parameter may enable a specific content of the sticker finally added to the data to be shared correspond to the interaction event. For example, taking the foregoing interaction event, the type of sticker, and the MOBA game application as examples, for a sticker with the notification type generated based on LIVE events, the sticker generation parameter may be a friend, a fan, a follower, etc. of the current user. For a sticker with the reminder type generated based on LIVE events, the sticker generation parameter may be specific date associated with the LIVE events. For a sticker with the voting type generated based on news released by new heroes, the sticker generation parameter may be an option in a relevant statistical task of newly obtained hero characters.

The sticker generation parameter of each of the above-described specific forms and contents may be generated based on the interaction event, by any feasible related techniques, such as page data crawling, image recognition, data association, etc., which are not limited in the embodiments of the present application.

Step S204, in response to an editing instruction performed on the sticker, edit the sticker. In this embodiment, before the final publishing, the sticker added to the data to be shared may also be personalized for users to edit to achieve personalized expression of the user.

During specific implementation, for any type of sticker, the user may input an editing instruction for the sticker to modify or adjust the general properties of the sticker. For example, the user may input editing instructions for the sticker to modify a display position, a shape, a size and other properties of the sticker, and in response to the editing instructions, the corresponding editing processing on the sticker is performed, such as repositioning the sticker to adjust the display position, scaling and deforming the sticker to adjust the size and shape, etc.

In addition, any type of sticker may also include text content, which may also be personalized for users to edit. Specifically, in response to the user's editing instruction, a default text content included in the sticker may be deleted and the content included in the sticker may be modified to the content typed by the user based on the content typed by the user included in the editing instruction.

During specific implementation, for different types of stickers, they may also be edited accordingly by users based on the type of sticker. For example, for a sticker with the notification type, the target user pointed to by the sticker may be modified based on an editing instruction input by the user. For a sticker with the reminder type, a target date automatically triggered by a reminder task generated by the sticker may be modified based on an editing instruction input by the user. For a sticker with the voting type, a voting option may be modified based on an editing instruction input by the user. In addition, for the editing of the above types of stickers, a text content included in the sticker may also be modified accordingly. For example, after editing and modifying the target user, the text content included in the sticker will be accordingly modified to a username of a new target user; after editing and modifying the target date, the text content included in the sticker will be accordingly modified to a new date.

Step S205, publish the data to be shared with the sticker in the first target application for sharing.

In this embodiment, after personalized editing processing, i.e., the data to be shared with stickers in the first target application publishes to achieve the sharing of game data.

Figure 3:
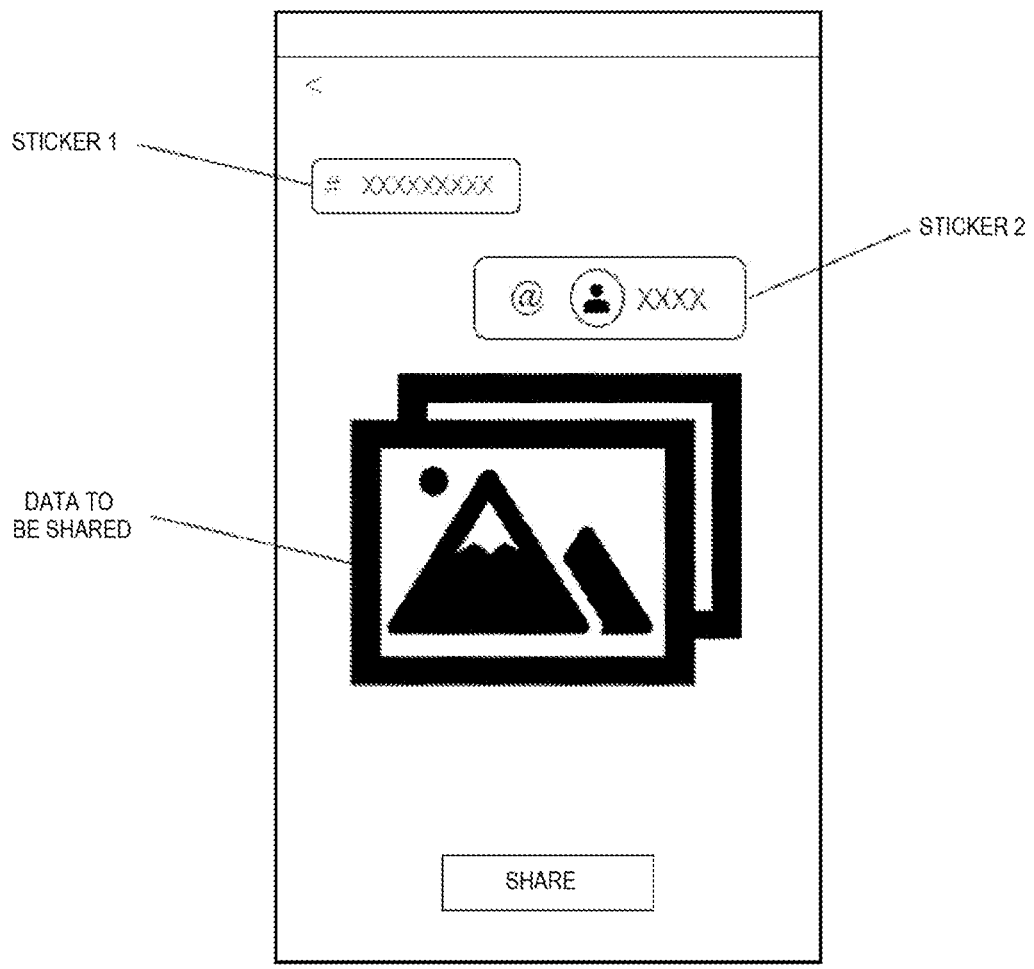
FIG. 3 is a specific example diagram of a second page in the embodiments of the present disclosure.

Referring to FIG. 3, it is a specific example of the second page after adding stickers. The second page includes the data to be shared. Taking the MOBA game application as an example, the data to be shared may be a video clip, a picture, and other content of the MOBA game match. The second page also includes two stickers, a sticker 1 and a sticker 2. The type of sticker 1 may be, for example, a jumping type or a jumping type. When the user triggers the sticker 1, they may jump to relevant topic pages, details pages, etc. of game matches or hero characters involved in game matches, or directly jump to the game application. The sticker 1 also includes a text content (replaceable text content is represented as "XXX" on the sticker 1), which the user may edit based on their personalized expression needs. The type of sticker 2 may be a notification type. When the user triggers the sticker 2, a message reminder may be sent to the target user. The sticker 2 also includes a text content, including a username and an avatar, etc. of the target user (replaceable text content is represented as "XXX" on the sticker 2). The user may edit and modify the target user and update the displayed text content accordingly. The user may click a share button at the bottom of the page to publish the data to be shared with the stickers to achieve the sharing of game data.

Figure 4:
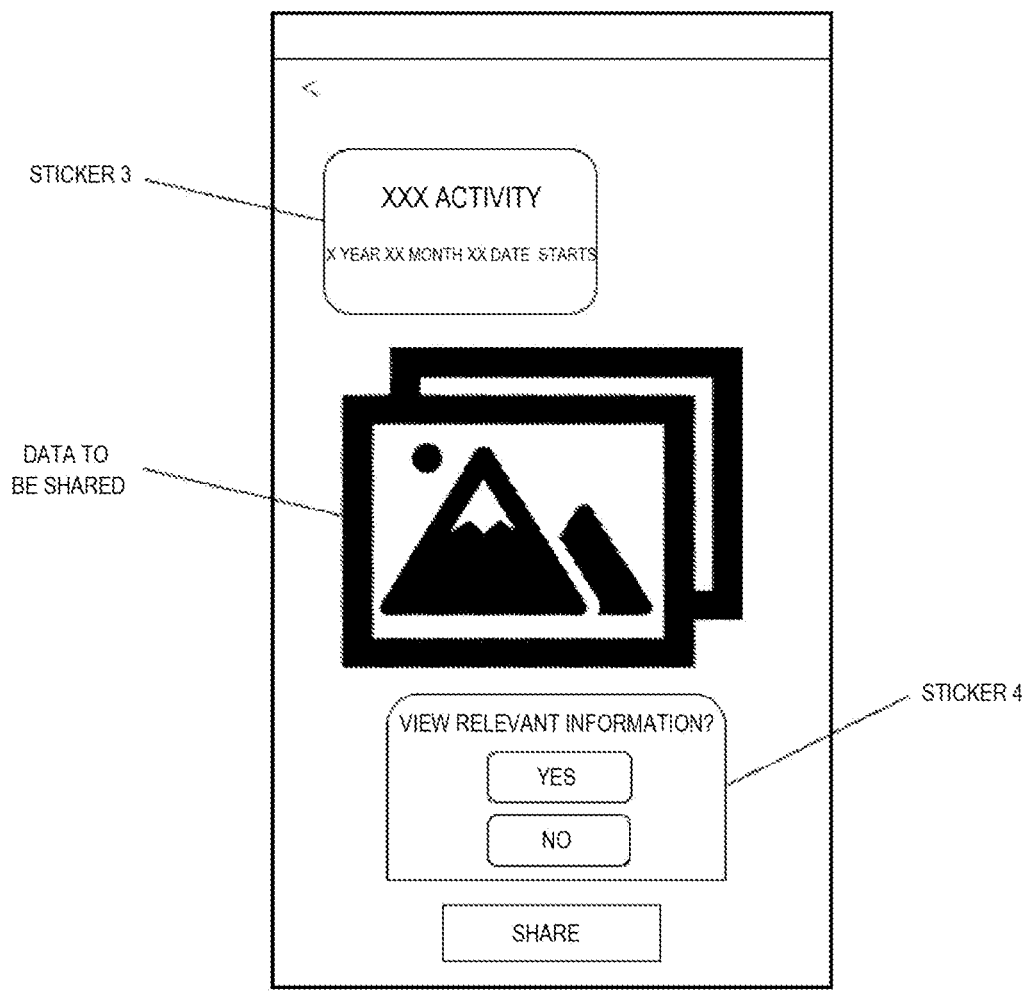
FIG. 4 is another specific example diagram of a second page in the embodiments of the present application.

Referring to FIG. 4, it is another specific example of the second page after adding stickers. The second page includes the data to be shared. Taking the MOBA game application as an example, the data to be shared may be a video clip, a picture, and other content of the MOBA game match. The second page also includes two stickers, a sticker 3 and a sticker 4. The type of sticker 3 may be a reminder or a jumping type. When the user triggers the sticker 1, they may generate a reminder task for the corresponding date, or directly jump to the game application to enter the corresponding activity page later. The type of sticker 2 may be a voting type. When the user triggers the sticker 2, they may select the corresponding option. Counting and statistics will be performed in the background, and statistical results may be further presented to the user. The user may click the share button at the bottom of the page to publish the data to be shared with stickers to achieve the sharing of game data.

As can be seen from the above embodiments, the method of game data processing of the present application is based on the data to be shared generated in the game application, and further adds stickers based on the type of page that triggers sharing, enriching the content of data to be shared through the stickers. The added stickers can also be edited by the users, and personalized content can be added to the data to be shared based on user editing. Through the solution of the present application, the content of game data sharing can be effectively enriched, and personalized expression can be achieved. In addition, the added stickers can also perform a predetermined processing in the application on a triggering terminal device after being triggered, improving the interactivity of game data sharing.

Figure 5:
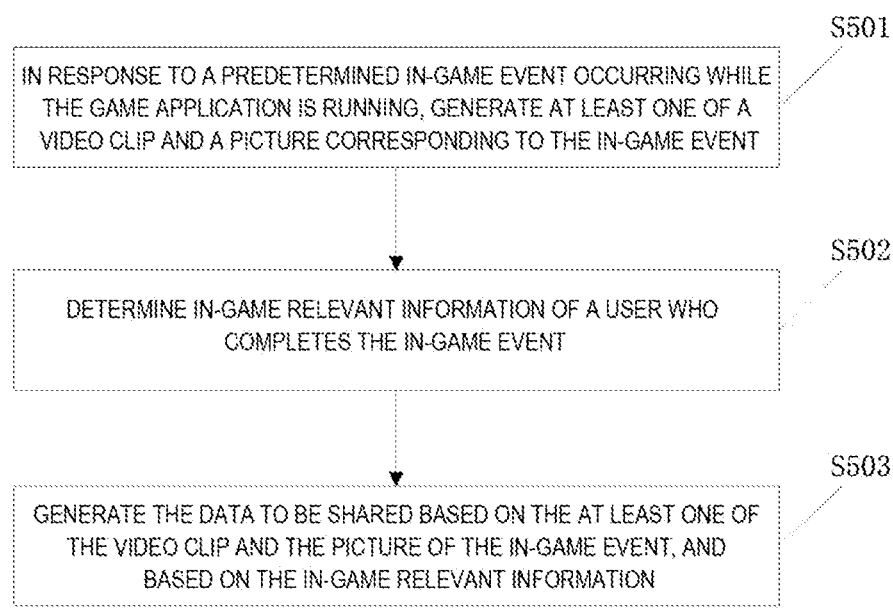
FIG. 5 is a schematic flowchart of a method of generating data to be shared in the embodiments of the present application.

In some alternative embodiments, the method of game data processing of the present application further includes a method of generating the data to be shared. Referring to FIG. 5, the method of generating the data to be shared may include the following steps.

Step S501, in response to a predetermined in-game event occurring while the game application is running, generate at least one of a video clip and a picture corresponding to the in-game event.

In this embodiment, in the game process of the game application, when the user completes a specific in-game event, a significant beneficial effect will be generated in the game, which is usually referred to as a highlight event. Taking the MOBA game application as an example, the above-mentioned in-game events, such as the first kill of other players during a match (first kill) and killing multiple other users simultaneously (pentakill, double-kill, etc.), can be considered as highlight events. In the scenario of game data sharing, the highlight events are often game data that users are eager to share.

In this embodiment, the predetermined in-game event refers to a highlight event. In specific implementation, the respective in-game events that occur during the game process of the game application may be detected by event tracking. When event tracking is triggered, it indicates that a highlight event has occurred. In response to the occurrence of the highlight event, at least one of a video clip and a picture corresponding to the highlight event may be generated. Herein, the generation of the video clip may be achieved by screen recording, and a screen recording rule is predetermined; for example, video data obtained by screen recording in a predetermined period of time before and after the highlight event occurs may be intercepted to generate a video clip corresponding to the highlight event. For the generation of pictures, it may be implemented by taking a screenshot, and the same predetermined screenshot rules are set; for example, screenshot processing may be performed at the time of the highlight event to obtain a picture corresponding to the highlight event. During specific implementation, it is to generate the data to be shared using video clips or pictures alone, or to generate the data to be shared using video clips and pictures at the same time and may be set according to the implementation needs.

In some implementations, considering that the performance of the terminal device is poor, or the current network environment is not good, when using video clips to generate the data to be shared in the above case, it will increase the data processing pressure on the terminal device and affect the user experience of the terminal device. To this end, when generating a video clip and/or picture of an in-game event, the following methods may be used: determining a performance parameter of a current terminal device and a current network environment parameter; and in response to determining that at least one of the performance parameter and the network environment parameter fails to meet a corresponding standard value, only generating a picture corresponding to the in-game event.

During specific implementation, in response to a predetermined in-game event, the performance parameter of the current terminal device and the current network environment parameter are obtained, and it is determined whether the performance parameter and network environment parameter may meet the corresponding standard value. Herein, the performance parameter may be a hardware configuration of the terminal device, which may be obtained by reading hardware information of the terminal device; the performance parameter may also a currently displayed frame rate, which reflects the quality of the hardware configuration of the terminal device through the frame rate. The network environment parameter may be a real-time speed of the current network communication. Correspondingly, the standard values of the performance parameter and network environment parameter are predetermined, which may be a minimum value that does not affect the user experience of the terminal device when sharing game data with video clips as content. If it is determined that at least one of the performance parameters of the current terminal device and the current network environment parameters does not meet the corresponding standard value, only a picture of the in-game event may be generated after the predetermined in-game event occurs, and a video clip is not generated. This may ensure that the game data is shared without affecting the user experience of the terminal device. If it is determined that the performance parameters of the current terminal device and the current network environment parameters may meet the corresponding standard values, the video clip of the in-game event may be generated after the predetermined in-game event occurs, or the video clip and picture may be generated simultaneously.

Step S502, determine in-game relevant information of a user who completes the in-game event.

In this embodiment, the data to be shared includes not only video clips and/or pictures of in-game events, but also some in-game relevant information to ensure the integrity of the shared content. During specific implementation, the in-game relevant information may be in-game and user relevant information, game progress relevant information, etc. Taking the MOBA game application as an example, in-game relevant information may include: the user's nickname, the user's level in the game, the user's historical achievements, a hero role used by the user, data of game match, etc.

Step S503, generate the data to be shared based on the at least one of the video clip and the picture of the in-game event, and based on the in-game relevant information.

In this embodiment, at least one of the video clip and picture of the in-game event obtained in the preceding steps, and the in-game relevant information, that is, the data to be shared may be integrated. The process of integrating the video clip and/or picture with the in-game relevant information may be completely completed locally in the current terminal device.

In some implementations, during the operation of the game application, a predetermined in-game event (highlight event) may occur more times. To prevent the amount of the data to be shared generated from being too large or the duration from being too long, a certain number of video clips of in-game event may be selected to generate the data to be shared. The specific method may include: selecting a predetermined number of target video clips from a certain number of video clips of the in-game event; concatenating the predetermined number of the target video clips to obtain a video data set; generating the data to be shared based on the video data set and the in-game relevant information.

Herein, the target video clips refer to video clips selected from all the video clips. The specific value of the predetermined number, as well as the rules and standards for selecting the target video clips, may be set according to the specific implementation needs. The video data set is a result obtained by concatenating the selected target video clip, which is usually referred to as a video collection.

In addition, in some implementations, when only the picture of the in-game event is used, a part of all pictures may be selected to obtain a picture set, and the data to be shared may be generated based on the obtained picture set. The obtained video data set and picture set may also be stored in a local memory of the terminal device for the user to view at any time.

In some implementations, when selecting the target video clip from all video clips, a priority of the in-game event corresponding to the video clip may be used as the basis. The specific method includes: determining a priority of each in-game event; selecting, based on the priority, the predetermined number of target video clips. The priority of the in-game event corresponding to the video clip is predetermined, and the level of the priority may be determined based on the difficulty or probability of completing the in-game event. Specifically, for an in-game event, if its completion difficulty is high or the implementation probability is low, its corresponding priority may be set higher; conversely, if the completion difficulty of the in-game event is low or the implementation probability is high, its corresponding priority may be set lower. Taking the MOBA game application as an example, if the completion difficulty of the in-game event of pentakill is the most difficult, its priority may be set to the highest, and if the completion difficulty of the four-kill, three-kill, and double-kill decreases sequentially, its corresponding priority may be set to decrease sequentially. During specific implementation, based on the level of the priority of the respective video clips corresponding to the in-game event are sequentially sorted from high to low, sequentially selected until a predetermined number of target video clips are obtained.

In some implementations, considering the completion difficulty of some in-game event is extremely high or the probability of occurrence is very low, when the kind of in-game event occurs, the corresponding video clip is the content that the user most wants to share. To this end, selecting, based on the priority, the predetermined number of target video clips may specifically include: in response to determining a predetermined highest priority among priorities of respective in-game events, selecting a video clip of the in-game event with the highest priority as the target video clip; and in response to determining no predetermined highest priority among the priorities of the respective in-game events, selecting the predetermined number of target video clips in order of the priorities from high to low.

During specific implementation, based on the priority predetermined for the in-game event corresponding to the video clip, the in-game event with the highest priority is determined. For the respective video clips, the priority of the corresponding in-game events is determined accordingly. If there is the highest priority among priorities of the in-game events corresponding to these video clips, only the video clip of the in-game event with the highest priority is selected as the target video clip, and other video clips are abandoned. If there is no highest priority among the priorities of the in-game events corresponding to these video clips, the target video clips may be selected in order of the priorities from high to low until the predetermined number of target video clips are obtained. Taking the MOBA game application as an example, the priority of in-game events for pentakill is set to the highest. When video clips corresponding to pentakill, four-kill and three-kill are obtained during the game process, only the video clip corresponding to pentakill is selected as the target video clip. Considering that the in-game event with the highest priority do not occur frequently, all video clips of in-game events with the highest priority may be selected as the target video clips.

During specific implementation, in the related art, for the scenario of sharing game data, there are also some existing generation algorithms of game sharing data. These generation algorithms of game sharing data may be implemented based on Machine Learning models, which may generate data for sharing based on materials such as video clips, pictures, and in-game relevant information. The data generated by the existing generation algorithm of game sharing data may be based on the powerful algorithm and rich dataset advantages of Machine Learning models to intelligently edit, match background music, match display effects, and match text contents for the original video clips and pictures. Based on the above situation, in some implementations, this embodiment may further generate the data to be shared through a predetermined generation algorithm of game sharing data, based on the at least one of the video clip and the picture of the in-game event obtained in the aforementioned steps and based on the in-game relevant information. Herein, the specific generation algorithm of game sharing data may be selected according to the implementation needs and is not limited in this embodiment. In addition, based on the advantage of computing power, the generation algorithm of game sharing data is often deployed on a server. In this embodiment, the at least one of the video clip and picture of the in-game event obtained locally and the in-game relevant information may be sent to the server for processing to obtain the data to be shared.

It can be seen from the above embodiments that the method of game data processing of the embodiments of the present application further comprises a related method of generating the data to be shared. This method may generate higher quality according to the characteristics of game applications and the needs of game data sharing, and may further improve the effect of sharing game data.

It should be noted that the method of the embodiments of the present application may be performed by a single device, such as a computer or a server, etc. The method of the embodiments of the present application may also be applied to a distributed scenario, where multiple devices cooperate with each other to complete. In this distributed scenario, one device among the plurality of devices may only perform one or more steps in the method of the embodiments of the present application, and these multiple devices will interact with each other to complete the method.

It should be noted that some embodiments of the present application have been described above. Other embodiments are within the scope of the appended claims. In some cases, the acts or steps recited in the claims may be performed in a different order than in the above embodiments and still achieve the desired results. In addition, the processes depicted in the drawings do not necessarily require a specific order or sequential order shown to achieve the desired results. In certain embodiments, multitasking and parallel processing are also possible or may be advantageous.

Figure 6:
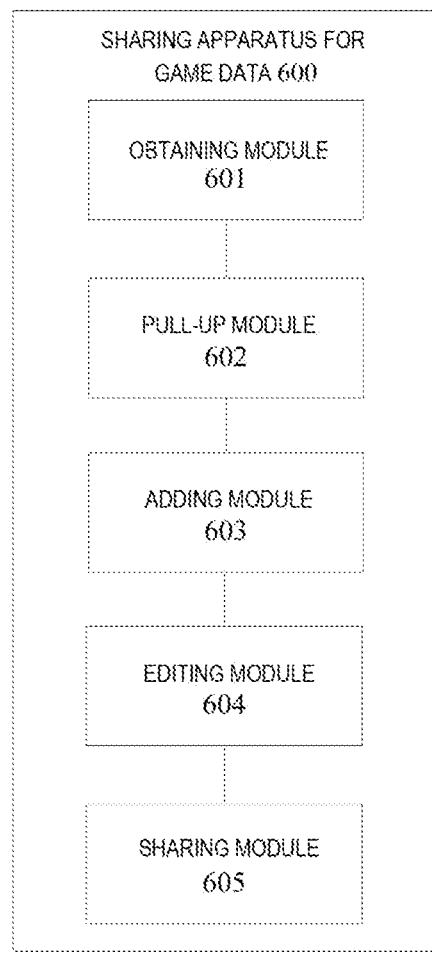
FIG. 6 is a structural schematic diagram of an apparatus for game data processing of the embodiments of the present application.

Based on the same technical concept, the embodiments of the present application also provide an apparatus for game data processing. Referring to FIG. 6, the apparatus 600 for game data processing comprises:

an obtaining module 601 configured to, in response to a sharing instruction on a first page of a game application, obtain data to be shared generated in the game application;

a jumping module 602 configured to jump to a first target application and show a second page of the first target application, a preview of the data to be shared being displayed on the second page;

an adding module 603 configured to add a sticker to the data to be shared, the sticker being used to, after being triggered, perform a predetermined processing in a second target application on a terminal device that triggers the sticker;

an editing module 604 configured to, in response to an editing instruction performed on the sticker, edit the sticker; and a sharing module 605 configured to publish the data to be shared with the sticker in the first target application for sharing.

As an alternative embodiment, the adding module 603 is configured to determine at least two different types of stickers, wherein different types of stickers are used to perform different predetermined processing; determine at least one target sticker based on an association relationship between a type of sticker and a page content of the first page; generate a sticker generation parameter based on the page content of the first page; and add the target sticker to the data to be shared based on the sticker generation parameter.

As an alternative embodiment, the adding module 603 is configured to determine at least one interaction event associated with the game application in the first target application; determine at least one target sticker based on one or more of the at least one interactive event; generate a sticker generation parameter for the target sticker; and add the target sticker to the data to be shared based on the sticker generation parameter.

As an alternative embodiment, the adding module 603 is configured to determine, based on the data to be shared, an interaction event associated with the data to be shared in the at least one interaction event; and determine the at least one target sticker based on the interaction event associated with the data to be shared.

As an alternative embodiment, the adding module 603 is configured to obtain preference data of a current user; determine, based on the preference data, an interaction event associated with the preference data among the at least one interaction event; and determine the at least one target sticker based on the interaction event associated with the preference data.

As an alternative embodiment, the predetermined processing comprises one of: jumping to a third page in the second target application; sending a reminder message to a target user in the second target application; setting a reminder task to be triggered at a target date; generating counting data for a predetermined voting event and performing counting statistics; or jumping to a third target application on the terminal device that triggers the sticker.

As an alternative embodiment, the obtaining module 601 is configured to in response to a predetermined in-game event occurring while the game application is running, generate at least one of a video clip and a picture corresponding to the in-game event; determine in-game relevant information of a user who completes the in-game event; and generate the data to be shared based on the at least one of the video clip and the picture of the in-game event, and based on the in-game relevant information.

As an alternative embodiment, the obtaining module 601 is configured to determine a performance parameter of a current terminal device and a current network environment parameter; and in response to determining that at least one of the performance parameter and the network environment parameter fails to meet a corresponding standard value, only generate a picture corresponding to the in-game event.

As an alternative embodiment, the obtaining module 601 is configured to select a predetermined number of target video clips from a certain number of video clips of the in-game event; concatenate the predetermined number of the target video clips to obtain a video data set; and generate the data to be shared based on the video data set and the in-game relevant information.

As an alternative embodiment, the obtaining module 601 is configured to determine a priority of each in-game event; and selecting, based on the priority, the predetermined number of target video clips.

As an alternative embodiment, the obtaining module 601 is configured to in response to determining a predetermined highest priority among priorities of respective in-game events, select a video clip of the in-game event with the highest priority as the target video clip; and in response to determining no predetermined highest priority among the priorities of the respective in-game events, select the predetermined number of target video clips in order of the priorities from high to low.

As an alternative embodiment, the obtaining module 601 is configured to generate the data to be shared by a predetermined generation algorithm of game sharing data based on the at least one of the video clip and the picture of the in-game event, and based on the in-game relevant information.

For convenience of description, when describing the above apparatus, they are divided into various modules to describe their functions separately. Of course, when implementing this application, the functions of each module can be implemented in the same or a plurality of software and/or hardware.

The apparatus of the above embodiments is configured for implementing any of the foregoing embodiments corresponding to the method of game data processing and has the beneficial effects of the corresponding method embodiment, not described herein again.

Based on the same technical concept, the embodiments of the present application further provide an electronic device comprising a memory, a processor and a computer program stored on the memory and executable on the processor, and the processor, when executing the program, implements the method of game data processing according to any embodiment described above.

Figure 7:
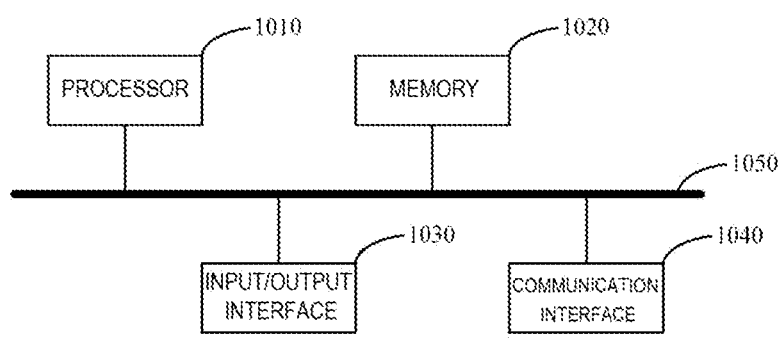
FIG. 7 is a structural schematic diagram of an electronic device of the embodiments of the present application.

FIG. 7 illustrates a more specific schematic diagram of a hardware structure of an electronic device provided in the embodiments of the present application. The device may include: a processor 1010, a memory 1020, input/output interface 1030, a communication interface 1040 and bus 1050. The processor 1010, the memory 1020, the input/output interface 1030 and the communication interface 1040 implement communication connections between each other within the device through the bus 1050.

The processor 1010 may be implemented using a general-purpose Central Processing Unit (CPU), a microprocessor, an Application Specific Integrated Circuit (ASIC), or one or more integrated circuits, etc., for executing related programs to implement the technical solution provided by the embodiments of the present specification.

The memory 1020 may be implemented using a Read Only Memory (ROM), a Random Access Memory (RAM), a static storage device, a dynamic storage device, etc. The memory 1020 may store operating systems and other application programs. When implementing the technical solution provided in the embodiments of this specification by software or firmware, the relevant program code is stored in the memory 1020 and executed by the processor 1010.

The input/output interface 1030 is used to connect an input/output module to achieve information input and output. The input/output module may be configured as a component in the device (not shown in the figure) or externally connected to the device to provide corresponding functions. The input device may include a keyboard, mouse, touch screen, microphone, various sensors, etc., and the output device may include a display, speaker, vibrator, indicator light, etc.

The communication interface 1040 is configured to connect a communication module (not shown in the figure) to achieve communication interaction between this device and other devices. The communication module may communicate through wired methods (such as USB, network cable, etc.) or wireless methods (such as mobile networks, WIFI, Bluetooth, etc.).

The bus 1050 includes a path to transmit information between the respective components of the device (e.g., the processor 1010, the memory 1020, the input/output interface 1030 and the communication interface 1040).

It should be noted that, although the above device only illustrates the processor 1010, the memory 1020, the input/output interface 1030, the communication interface 1040 and the bus 1050, but in the specific implementation process, the device may also include other components necessary for normal operation. In addition, those skilled in the art will appreciate that the above device may include only the components necessary to implement the embodiments of the present specification, without necessarily including all the components shown in the figures.

The electronic device of the above embodiments is configured for implementing any of the foregoing embodiments corresponding to the method of game data processing and has the beneficial effects of the corresponding method embodiment, not described herein again.

Based on the same technical concept, the embodiments of the present application further provide a non-transitory computer readable storage medium storing computer instructions which cause a computer to perform the method of game data processing according to any embodiment described above.

The computer readable medium of the embodiments of the present application includes both permanent and non-permanent, removable and non-removable media that can be implemented by any method or technology for storing information. Information may be computer-readable instructions, data structures, modules of programs, or other data. Examples of storage medium for computers include, but are not limited to, Phase-change Random Access Memory (PRAM), Static Random Access Memory (SRAM), Dynamic Random Access Memory (DRAM), other types of Random Access Memory (RAM), Read-Only Memory (ROM), Electrically Erasable Programmable Read-Only Memory (EEPROM), flash memory, or other memory technologies, Compact Disc Read-Only Memory (CD-ROM), Digital Versatile Disc (DVD), or other optical storage, magnetic cassettes, magnetic tape magnetic disk storage, or other magnetic storage devices or any other non-transmission media that may be used to store information to be accessed by computing devices.

The computer instructions stored in the storage medium of the above-described embodiments are used to cause the computer to perform the method of game data processing according to any of the embodiments and has the beneficial effects of the corresponding method embodiment, not described herein again.

It should be noted that unless otherwise defined, the technical or scientific terms used in this application should be understood by those with general skills in the field to which this application belongs. The words "first", "second", and similar words used in this application do not indicate any order, quantity, or importance, but are only used to distinguish different components. Words like "including" or "containing" mean that elements or objects that appear before the word cover the elements or objects listed after the word and their equivalents, and do not exclude other elements or objects. Words like "connecting" or "connected" are not limited to physical or mechanical connections, but may include electrical connections, whether direct or indirect. Articles "a" or "an" before elements do not exclude the existence of multiple such elements.

Although the spirit and principles of the present application have been described with reference to several specific descriptions, it should be understood that the present application is not limited to the specific implementations disclosed, and the division of aspects does not mean that the features in these aspects cannot be combined for benefit. This division is only for convenience of expression. The present application is intended to cover various modifications and equivalent arrangements included within the spirit and scope of the attached claims. The scope of the attached claims is to be interpreted in the broadest sense, thus encompassing all such modifications and equivalent structures and functions.

We claim:

1. A method of game data processing, comprising:
in response to a sharing instruction on a first page of a game application, obtaining data to be shared generated in the game application;
jumping to a first target application and presenting a second page of the first target application, a preview of the data to be shared being displayed on the second page;
adding a sticker to the data to be shared, wherein the sticker comprises a visual, triggerable element configured to, after being triggered, cause a different predetermined processing in a second target application on a terminal device that triggers the sticker, wherein the different predetermined processing varies depending on a type of sticker and comprises at least one of:
pulling up a third target application on the terminal device that triggers the sticker;
jumping to a third page in the second target application;
sending a reminder message to a target user in the second target application;
generating counting data for a predetermined voting event and performing counting statistics; or
creating a reminder task to be triggered at a target date;
wherein different types of stickers are mapped to different types of predetermined processing and are selected based on contextual information associated with the game data or the first page of the game application;
in response to the type of the sticker and an editing instruction input by a current user and performed on the sticker, editing the sticker, wherein the editing includes modifying sticker metadata including at least one of the target user, a trigger time, a voting option, or a linked content; and
publishing the data to be shared with the sticker in the first target application for sharing.

2. The method of claim 1, wherein adding the sticker to the data to be shared comprises:
determining at least two different types of stickers;
determining at least one target sticker based on an association relationship between the type of sticker and a page content of the first page;
generating a sticker generation parameter based on the page content of the first page; and
adding the target sticker to the data to be shared based on the sticker generation parameter.

3. The method of claim 1, wherein adding the sticker to the data to be shared comprises:
determining at least one interaction event associated with the game application in the first target application;
determining at least one target sticker based on one or more of the at least one interactive event;
generating a sticker generation parameter for the target sticker; and
adding the target sticker to the data to be shared based on the sticker generation parameter.

4. The method of claim 3, wherein determining at least one target sticker based on one or more of the at least one interactive event comprises:
determining, based on the data to be shared, an interaction event associated with the data to be shared in the at least one interaction event; and
determining the at least one target sticker based on the interaction event associated with the data to be shared.

5. The method of claim 3, wherein determining at least one target sticker based on one or more of the at least one interactive event comprises:
obtaining preference data of the current user;
determining, based on the preference data, an interaction event associated with the preference data among the at least one interaction event; and
determining the at least one target sticker based on the interaction event associated with the preference data.

6. The method of claim 1, further comprising:
generating the data to be shared by:
in response to a predetermined in-game event occurring while the game application is running, generating at least one of a video clip and a picture corresponding to the in-game event;
determining in-game relevant information of a user who completes the in-game event; and
generating the data to be shared based on the at least one of the video clip and the picture of the in-game event, and based on the in-game relevant information.

7. The method of claim 6, wherein generating at least one of the video clip and the picture corresponding to the in-game event comprises:
determining a performance parameter of a current terminal device and a current network environment parameter; and
in response to determining that at least one of the performance parameter and the current network environment parameter fails to meet a corresponding standard value, only generating the picture corresponding to the in-game event.

8. The method of claim 6, wherein generating the data to be shared based on the at least one of the video clip and the picture of the in-game event, and based on the in-game relevant information comprises:
selecting a predetermined number of target video clips from a certain number of video clips of the in-game event;
concatenating the predetermined number of the target video clips to obtain a video data set; and
generating the data to be shared based on the video data set and the in-game relevant information.

9. The method of claim 8, wherein selecting the predetermined number of target video clips from the certain number of video clips of the in-game event comprises:
determining a priority of each in-game event; and selecting, based on the priority, the predetermined number of target video clips.

10. The method of claim 9, wherein selecting, based on the priority, the predetermined number of target video clips comprises:
in response to determining a predetermined highest priority among priorities of respective in-game events, selecting a video clip of the in-game event with the highest priority as the target video clip; and
in response to determining no predetermined highest priority among the priorities of the respective in-game events, selecting the predetermined number of target video clips in order of the priorities from high to low.

11. The method of claim 6, wherein generating the data to be shared based on the at least one of the video clip and the picture of the in-game event, and based on the in-game relevant information comprises:
generating the data to be shared by a predetermined generation algorithm of game sharing data based on the at least one of the video clip and the picture of the in-game event, and based on the in-game relevant information.

12. An electronic device, comprising a memory, a processor, and a computer program stored on the memory and executable on the processor, wherein the processor, when executing the program, implements acts comprising:
in response to a sharing instruction on a first page of a game application, obtaining data to be shared generated in the game application;
jumping to a first target application and presenting a second page of the first target application, a preview of the data to be shared being displayed on the second page;
adding a sticker to the data to be shared, wherein the sticker comprises a visual triggerable element configured to, after being triggered, cause a different predetermined processing in a second target application on a terminal device that triggers the sticker, wherein the different predetermined processing varies depending on a type of sticker and comprises at least one of:
pulling up a third target application on the terminal device that triggers the sticker;
jumping to a third page in the second target application;
sending a reminder message to a target user in the second target application:
generating counting data for a predetermined voting event and performing counting statistics, or
creating a reminder task to be triggered at a target date;
wherein different types of stickers are mapped to different types of predetermined processing and are selected based on contextual information associated with the game data or the first page of the game application;
in response to the type of the sticker and an editing instruction input by a current user and performed on the sticker, editing the sticker, wherein the editing includes modifying sticker metadata including at least one of: the target user, a trigger time, a voting option, or a linked content; and
publishing the data to be shared with the sticker in the first target application for sharing.

13. The device of claim 12, wherein adding the sticker to the data to be shared comprises:
determining at least two different types of stickers;
determining at least one target sticker based on an association relationship between the type of sticker and a page content of the first page;
generating a sticker generation parameter based on the page content of the first page; and
adding the target sticker to the data to be shared based on the sticker generation parameter.

14. The device of claim 12, wherein adding the sticker to the data to be shared comprises:
determining at least one interaction event associated with the game application in the first target application;
determining at least one target sticker based on one or more of the at least one interactive event;
generating a sticker generation parameter for the target sticker; and
adding the target sticker to the data to be shared based on the sticker generation parameter.

15. The device of claim 14, wherein determining at least one target sticker based on one or more of the at least one interactive event comprises:
determining, based on the data to be shared, an interaction event associated with the data to be shared in the at least one interaction event; and
determining the at least one target sticker based on the interaction event associated with the data to be shared.

16. The device of claim 14, wherein determining at least one target sticker based on one or more of the at least one interactive event comprises:
obtaining preference data of the current user;
determining, based on the preference data, an interaction event associated with the preference data among the at least one interaction event; and
determining the at least one target sticker based on the interaction event associated with the preference data.

17. The device of claim 12, further comprising:
generating the data to be shared by:
in response to a predetermined in-game event occurring while the game application is running, generating at least one of a video clip and a picture corresponding to the in-game event;
determining in-game relevant information of a user who completes the in-game event; and
generating the data to be shared based on the at least one of the video clip and the picture of the in-game event, and based on the in-game relevant information.

18. A non-transitory computer readable storage medium storing computer instructions which cause a computer to perform acts comprising:
in response to a sharing instruction on a first page of a game application, obtaining data to be shared generated in the game application;
jumping to a first target application and presenting a second page of the first target application, a preview of the data to be shared being displayed on the second page;
adding a sticker to the data to be shared, wherein the sticker comprises a visual, triggerable element configured to, after being triggered, cause a different predetermined processing in a second target application on a terminal device that triggers the sticker, wherein the different predetermined processing varies depending on a type of sticker and comprises at least one of:
pulling up a third target application on the terminal device that triggers the sticker;
jumping to a third page in the second target application;
sending a reminder message to a target user in the second target application;
generating counting data for a predetermined voting event and performing counting statistics; or
creating a reminder task to be triggered at a target date;

wherein different types of stickers are mapped to different types of predetermined processing and are selected based on contextual information associated with the game data or the first page of the game application;

in response to the type of the sticker and an editing instruction input by a current user and performed on the sticker, editing the sticker, wherein the editing includes modifying sticker metadata including at least one of the target user, a trigger time, a voting option, or a linked content; and publishing the data to be shared with the sticker in the first target application for sharing.

* * * * *